Aug. 18, 1953     A. H. LAMB     2,648,983
ELECTRICAL THERMOMETER FOR MEASURING HIGH TEMPERATURES
Filed March 10, 1950
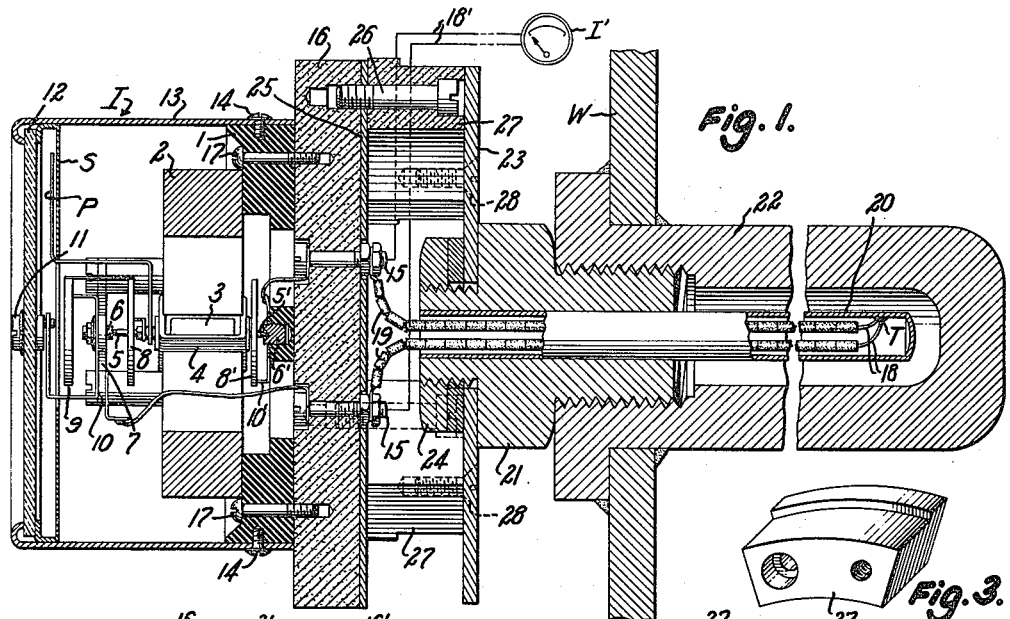
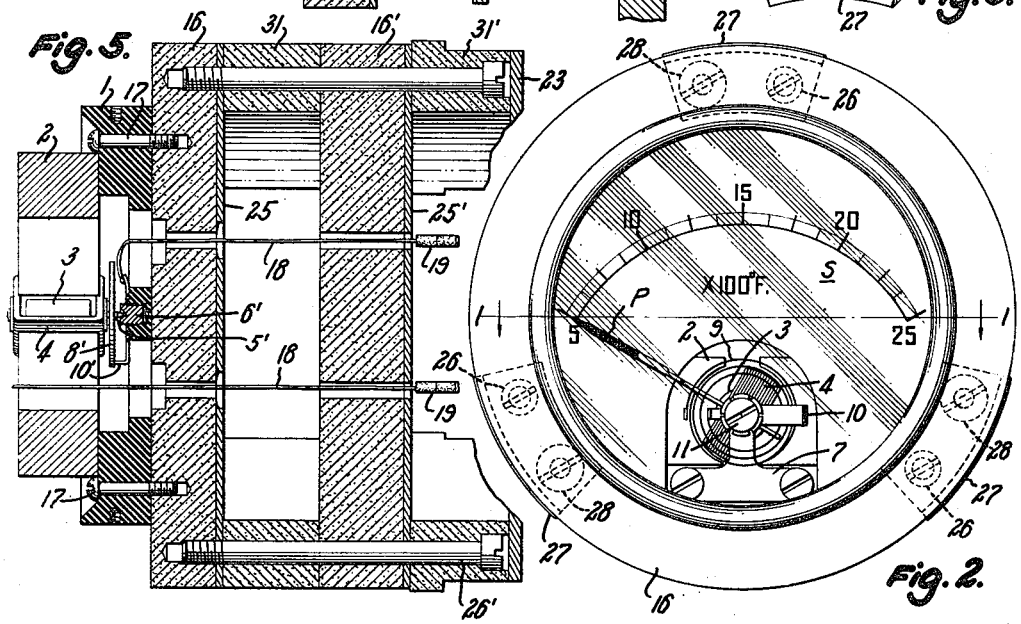
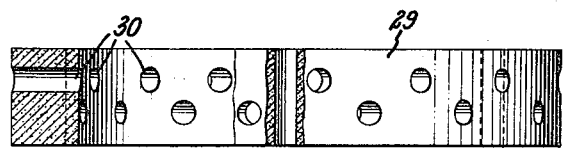
INVENTOR:-
Anthony H. Lamb,
BY
Pierce, Scheffler & Parker,
Attorneys.

Patented Aug. 18, 1953

2,648,983

UNITED STATES PATENT OFFICE 2,648,983

ELECTRICAL THERMOMETER FOR MEASURING HIGH TEMPERATURES

Anthony H. Lamb, Hillside, N. J., assignor to Weston Electrical Instrument Corporation, Newark, N. J., a corporation of New Jersey Application March 10, 1950, Serial No. 148,842

1 Claim. (Cl. 73—359)

This invention relates to electrical thermometers for measuring high temperatures, and more particularly a so-called "spot" thermometer or unitary device to be mounted or installed at the point of use.

The current practice is to mount a thermocouple in the wall of a turbine, flue, oven or other device when the temperature to be measured is above about 1000° F., and to locate the associated measuring instrument of the electrical pyrometer at some distance from the high temperature device to protect it from the heat. The temperature of the measuring instrument should not rise above about 200° F. and the prior practice of locating the instrument at some distance from highly heated apparatus, for example a gas turbine system in which the temperatures often exceed about 2000° F., has been very inconvenient as each operator having charge of and responsible for regulation of a particular section of the turbine system must turn away from, or move away from, the control mechanism or other indicating instruments to see the temperature indications. It is not practical to control the operation of the several sections of present day gas turbine systems of large power output from a central station, and the prior practice of locating a number of temperature indicators of a heated system at a central point is of little or no utility so far as concerns control and regulation of the turbine system. An on-the-spot measurement of temperature at the several sections of the turbine is essential for efficient regulation of the operation, but it is also desirable to provide remote indications of the several temperatures at a central station for supervision of the control adjustments made by the several operators.

Objects of the invention are to provide electrical thermometers for use at high temperatures and which include, as a unitary assembly, a measuring instrument mounted directly upon the stem or socket in which the thermocouple element is located; the stem or socket having a threaded or equivalent portion for installing it on a device within which gases or liquids are at a high temperature. An object is to provide an electrical spot thermometer or compensated electrical pyrometer having all parts thereof assembled as a unitary device upon a mounting stem or socket. An object is to provide an electrical spot thermometer of the type stated in which the measuring instrument is protected from high temperatures by highly polished heat-reflecting plates and by one or more air spaces in which, if desired, air currents may be established for the further cooling of the measuring instrument.

These and other objects and the advantages of the invention will be apparent from the following specification when taken with the accompanying drawing in which:

Fig. 1 is a central horizontal section, as seen on line I—I of Fig. 2, through an electrical thermometer embodying the invention, and through the adjacent heated structure in which the thermometer is mounted;

Fig. 2 is a front elevation of the thermometer;

Fig. 3 is a perspective view of one of the spacing blocks of heat insulating material;

Fig. 4 is an elevation, partly in section, through another form of insulating spacer; and Fig. 5 is a fragmentary central section through another embodiment of the invention.

In the drawings, the reference character I identifies generally a sensitive direct current measuring instrument of an electrical pyrometer, the instrument being of conventional or desired construction and including, as shown, a base I supporting a magnetic system comprising a permanent magnet 2 and soft iron core 3 in the gap between the magnet pole faces. A coil 4 is supported for angular movement about the axis of the core by staffs 5, 5' seated in bearings 6, 6' mounted respectively in a bridge 7 and in the base I. The moving system includes a pointer P movable over a temperature scale printed or engraved on a scale plate S. The usual spiral restoring springs 8, 8' have their inner ends secured to the staffs 5, 5' which also serve as leads to the coil 4, and the outer end of the spiral spring 8 is connected to the outer end of a temperature compensating bimetallic spring 9 which has its inner end anchored to a spring abutment 10 which is supported on the bridge 7 for angular adjustment about the axis of staff 5. The end of the spring abutment 10 is reversely bent into alinement with the axis of staff 5 and is slotted to receive the eccentric pin of a zero adjuster II mounted in the cover glass 12 which closes the outer end of a cylindrical instrument casing 13 which is secured to the base I by screws 14. The outer end of the spiral spring 8' is anchored to a spring abutment 10' which is secured to the inner bearing 6'.

The instrument construction so far described is or may be conventional and forms no part of the present invention.

Terminal studs 15 for connection to the coil springs 8, 8' may be mounted in the instrument base 1, or, as shown in Fig. 1, in a disk 16 of heat resistant and heat insulating material, preferably of the asbestos fiber—Portland cement type such as sold under the trade-mark "Transite," to which the instrument base 1 is secured by screws 17. Leads 18 from a thermocouple T are connected to the terminal studs 15; the leads being bare wire insulated from each other by small beads 19 of ceramic material. When a temperature indication is desired at a central station, the remotely located instrument I' is connected to the terminal studs 15 by leads 18'.

The thermocouple T is preferably in contact with the small diameter hollow stem 20 of a thermocouple housing having a threaded head 21 for mounting the pyrometer assembly in the wall W of the heated device or, as illustrated, in a thermocouple well 22 which is welded and sealed into the wall W. A plate or disk 23, preferably of stainless steel, is secured to the mounting head 21 by a nut 24 and a second steel plate or disk 25 is secured to the inner face of the disk 16 by screws 26 which pass through "Transite" spacing blocks 27 to which the inner plate 23 is secured by screws 28.

The plates 23 and 25 have highly polished heat-reflecting surfaces which protect the instrument I from the temperature of the wall W, and air currents in the interspaces between the reflecting plates 23, 25, and between the inner plates 23 and the wall W afforded additional cooling which, if desired, may be increased by a blower, not shown, for establishing a forced air circulation in these spaces. The pair of highly polished metal plates extend in series across the path of heat flow by radiation and convection, and provide a resistance to heat transfer which is of a much higher order than might be expected when one considers that the inner plate 23 is heated by conduction through metal bodies in addition to heating by radiation from the wall W and the outer flange of the thermocouple wall 22. As indicative of the high efficiency of the described apparatus to maintain the instrument at temperatures of below about 200 F., an embodiment of the invention in which the heat reflecting plates were spaced by bushings 27 of one-half inch length, the heat insulating disk 16 of "Transite" was of somewhat less thickness, and the mounting head 21 of the thermocouple casing was so dimensioned that the inner heat reflecting plate 23 was about one-half inch from the face of the thermocouple well 22 or the wall W, has operated satisfactorily to measure temperatures within the wall W of up to about 2000° F.

For temperatures within the wall W of the order of up to 1200° F., the spacing blocks 27 may be replaced by an annulus of "Transite" or equivalent heat insulating material. For somewhat higher temperatures, the spacing blocks may be replaced by an annulus 29 of heat insulating material which is provided with radially extending ventilating openings 30 of circular or other desired cross-section; see Fig. 4.

For protection of the instrument of the unitary electrical pyrometer assembly from high temperatures of the order of 2500° F., and above, which are to be measured, additional heat reflecting plates and ventilating air spaces may be provided as shown in Fig. 5. Many parts of this embodiment of the invention may be, and preferably are, identical with similar parts of the previously described embodiment and are identified by the same reference numerals but will not be specifically described in detail. As compared with the previously described pyrometer, a second disk 16' of heat insulating material with a polished plate 25' of stainless steel at its inner face is spaced axially from the heat reflecting plate 25 by spacers 31 of "Transite" or ceramic heat insulating material, and the inner heat reflecting plate 23 is similarly spaced from the plate 25' by spacers 31'. The spacers 31 and 31' and the reflecting plates 25 and 25' are apertured to receive screws 26' which secure the disk 16' and plate 25' to the disk 16 on which the instrument I is mounted. The mounting head of the thermocouple casings is secured to the inner plate 23 as shown in Fig. 1, and the plate 23 is secured to the instrument and heat insulation assembly by screws, not shown, which pass through the plate 23 and are threaded into the insulating spacers 31'.

It is not essential that circumferentially spaced bushings 31 and/or 31' be employed to provide ventilation of one or both of the air spaces since cylindrical spacers, either without or with radial openings as shown in Fig. 4, may be employed in many instances. If a particular number N of air spaces and (N+1) heat reflecting plates do not afford sufficient protection of the instrument I, an additional air space may be provided without undue increase in the size of the spot thermometer assembly by adding another disk of insulating material and/or a heat reflecting plate.

As indicated by one of the connections in Fig. 5, the ends of the thermocouple wires, 18, 18 may be connected directly to the abutments of the spiral springs of the moving coil 4 to eliminate any temperature difference between the meter movement and the cold end of the thermocouple. Leads may of course be extended from the thermocouple wires 18, 18 to a duplicate instrument at a central supervisory station.

So far as is now known, it is broadly new to provide a unitary "spot" thermometer of the electrical pyrometer type which may be mounted in the wall, or in a thermocouple well installed on the wall, of a turbine or other apparatus within which the temperature is of the order of 2000° F. and upwards. It is therefore to be understood that the invention is not limited to the apparatus herein shown and described, and that various modifications which may occur to others after knowledge of the disclosed pyrometers fall within the spirit and scope of the invention as set forth in the following claim.

I claim:

An electrical pyrometer comprising the combination with a thermocouple casing having a threaded head for mounting the casing in a correspondingly threaded opening, a thermocouple within the casing, and a measuring instrument of permanent magnet-moving coil type energized by said thermocouple and having a scale graduated in values of temperature; of means supporting said instrument upon said mounting head and shielding said instrument from high temperatures to which said thermocouple may be exposed; said supporting means including a disk of heat resistant and heat insulating material to which said instrument is secured, a plurality of polished heat reflecting disks extending transversely across substantially the entire path of heat transmission from said mounting head to said instrument, one of said disks being secured to said mounting head and another being secured to the inner face of said disk of heat resistant and heat insulating material, and a plurality of spacers of heat resistant and heat insulating material between and spacing said polished heat reflecting disks from each other, said spacers being positioned between the edge portions of said polished heat reflecting disks and circumferentially spaced from each other to provide passages between said polished heat reflecting disks for convection cooling air currents.

ANTHONY H. LAMB.

References Cited in the file of this patent

UNITED STATES PATENTS

| Number | Name | Date |
|---|---|---|
| 1,761,392 | Hase | June 3, 1930 |
| 2,349,436 | Keeler | May 23, 1944 |
| 2,555,273 | Koci | May 29, 1951 |

FOREIGN PATENTS

| Number | Country | Date |
|---|---|---|
| 10,173 | Great Britain | 1907 |
| 268,430 | Great Britain | Mar. 31, 1927 |